(No Model.)

C. HALSTEAD.
CULINARY VESSEL.

No. 412,085. Patented Oct. 1, 1889.

Attest:
Court A Cooper
A. P. Grant

Inventor:
Charles Halstead
by John A Diederoheim
Attys.

UNITED STATES PATENT OFFICE.

CHARLES HALSTEAD, OF NEW YORK, N. Y.

CULINARY VESSEL.

SPECIFICATION forming part of Letters Patent No. 412,085, dated October 1, 1889.

Application filed May 12, 1882. Serial No. 61,142. (No model.)

*To all whom it may concern:*

Be it known that I, CHARLES HALSTEAD, a citizen of the United States, residing in the city, county, and State of New York, have invented a new and useful Improvement in Culinary Vessels, of which the following is a specification.

My invention relates to improvements in culinary vessels; and it consists in the combination and arrangement of parts as herein set forth and claimed.

Figure 1:
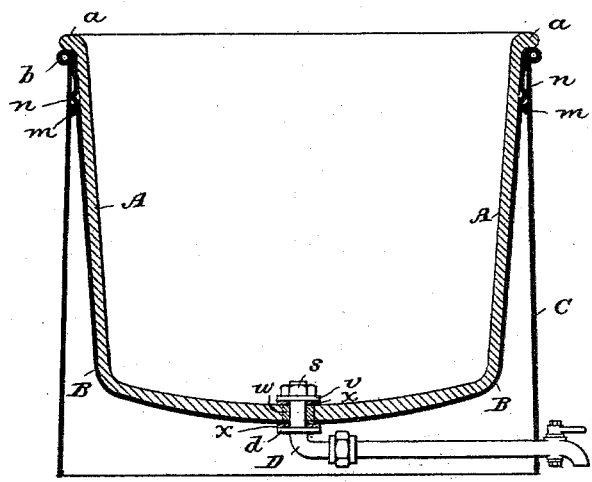
Figure 2:
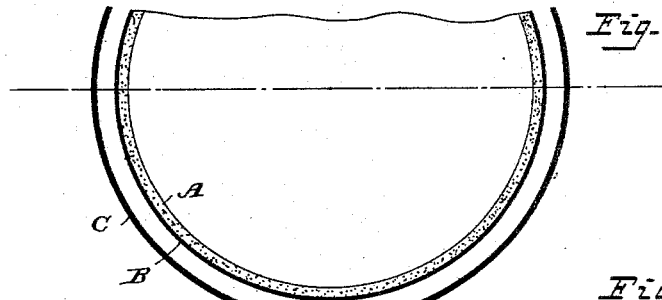
Figure 3:
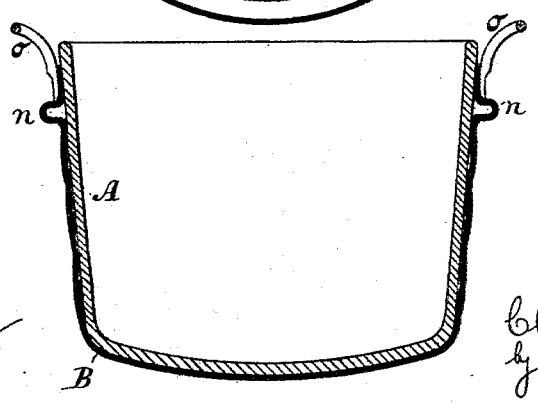

In the accompanying drawings, Figure 1 represents a vertical section of a culinary vessel embodying my invention. Fig. 2 represents a partial horizontal section of the same. Fig. 3 represents a vertical sectional view showing a band or casing provided with circumferential corrugations.

Similar letters of reference indicate corresponding parts in the several figures.

A represents a china or earthenware bowl. This bowl is inclosed in a metal casing B, fitting as tight as possible around the outside of the bowl A to prevent the direct action of the heat against the bowl, and thus prevent the danger of breakage. To insure a tight fit of the casing B over the outside of the bowl A, which in the process of burning is more or less irregular, I make this casing slightly corrugated, as shown in Fig. 3, and force the bowl therein, the corrugations conforming to the irregularities and thus insuring a perfect contact of the casing and bowl.

The bowl A, incased in the metal casing B, is suspended in an exterior metal case or inclosing-casing C, made of such size as to give the desired air or steam space in the chamber thereby formed around the bowl, and of such a length that when placed upon the stove or heating-surface the bottom of the bowl will be some distance above the same.

The bowl A is made with a projecting rim or flange $a$ at its top to rest upon the rim $b$ of the casing $c$ and be thus supported, and an outwardly-projecting rim or bead $n$ is made near the upper end of the casing B, corresponding with an inwardly-projecting rim or bead $m$ made on the inside of the casing $c$ to receive the bead of the casing B and thus support the interior bowl.

The bowl may be provided with a suitable cover if desired, and the same, as well as the casing C, may be provided with suitable handles or bails, by which the same may be handled. In the construction shown in Fig. 3 the bowl is provided with handles $o$, which are secured at a point near the top edge of the bowl on the band or casing.

To prevent any injurious effects to the china or earthenware bowl resulting from the difference of expansion between the metal cock or pipe to which the cock is attached and the china or other earthenware bowl, I make the hole in the bowl, where the cock or branch pipe is desired to be attached, larger in diameter, and surround the end of the cock or the pipe D with an elastic substance—such as cork, india-rubber, or wood—$u$, fitting tight around the end of the pipe D and into the hole.

Between the collar D and the outside of the bowl or casing and between the washer $y$ and the inside of the bowl suitable flexible washers $x$ are placed, screwed up tight, through the nut $s$.

By incasing a china, porcelain, or other earthenware bowl the danger of breaking the same is considerably lessened, and any injurious effect of the direct heat against the bowl is prevented, while the chamber formed between the bowl and the exterior casing will enable the heat to circulate around the bowl, thereby causing equal expansion and accelerate the boiling or cooking of the material in the bowl.

Having thus described my invention, what I claim as new, and desire to secure by Letters Patent, is—

1. A culinary vessel having an inner earthenware vessel and an outer metallic casing, and provided with an outlet-pipe leading from said inner vessel through said metallic casing, the said pipe having the collar $d$, the elastic packing $w$ $x$, and the nut $s$, said parts being combined substantially as described.

2. A culinary vessel having the earthenware or china bowl A, with a rim, the metallic casing with a bead $n$ and handles $o$, and the casing C, open at top and bottom, and provided with an interior supporting-bead $m$, said parts being combined substantially as described.

3. A culinary vessel having an earthenware inner vessel with a metallic encircling-casing, in combination with a metallic casing surrounding the inner vessel, and an outlet-pipe leading from said inner vessel through the inclosing-vessel, the said pipe having the collar $d$, the elastic packing $w\ x$, the washer $y$, and the nut $s$, substantially as described.

CHARLES HALSTEAD.

Witnesses:
HENRY E. ROEDER,
J. B. NOULZ.